Dec. 7, 1926.  
E. SCHULTZ  
SWIVEL CASTER  
Filed March 24, 1924

1,609,431

INVENTOR  
EDWARD SCHULTZ  
BY Earl M. Sinclair  
ATTORNEY

Patented Dec. 7, 1926.

1,609,431

UNITED STATES PATENT OFFICE.

EDWARD SCHULTZ, OF CHICAGO, ILLINOIS, ASSIGNOR TO JAMES B. LADD, OF DES MOINES, IOWA.

SWIVEL CASTER.

Application filed March 24, 1924. Serial No. 701,378.

An object of this invention is to provide an improved swivel caster in which efficient means is included for centering and retaining the caster stem in and relative to a hollow portion of a load object to be supported, such as the tubular leg of an article of furniture, or a separate socket member attached thereto.

A further object of this invention is to provide an improved construction and relationship between a spring yoke and a bridge plate carried thereby.

A further object of this invention is to provide improved means for supporting a transverse bridge plate relative to a caster stem and spring yoke, without piercing or perforating either the stem or the yoke arms.

A further object of this invention is to provide improved means for strengthening and reinforcing the spring yoke arms and at the same time employ such means for supporting a bridge plate in the yoke.

My invention consists in the construction, arrangement and combination of elements hereinafter set forth, pointed out in the claims and illustrated by the accompanying drawing, in which—

Figure 1:
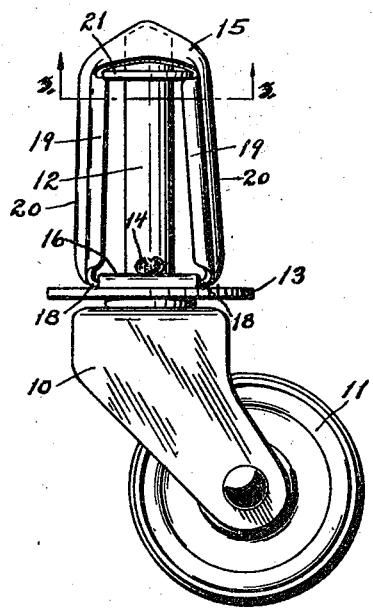
Figure 2:
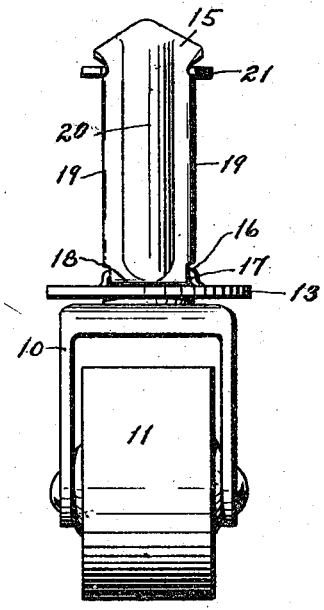
Figure 3:
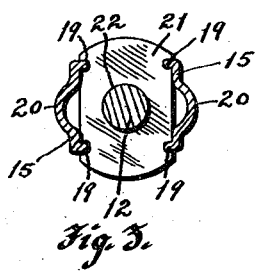

Figures 1 and 2 are side elevations at right angles to each other, illustrating my improved device. Figure 3 is a cross-section on the line 3—3 of Figure 1.

In the construction of the device as shown a caster is employed having a wheel yoke 10, a wheel 11 journaled therein, and a stem 12 fixed to and rising from said wheel yoke, which stem is circular in cross-section and of any suitable length. The details of construction of the caster proper form no part of my present invention, which relates particularly to the means for retaining and centering the caster and especially the stem 12 relative to a load object having a socket or bore of considerably greater diameter than said stem. A bearing disk 13 is provided and is apertured centrally to receive loosely the lower portion of the stem 12, said disk resting in a horizontal plane just above the top of the yoke 10, and the stem is held against downward movement through said disk by means of burrs 14 formed on the stem just above the disk, or by other suitable means placed in position after the disk is assembled upon the stem. A spring yoke 15 is provided, of generally inverted U-shape, and is adapted to embrace the stem 12 and have its closed end resting on the upper end thereof and have a pivotal bearing thereon. The upper end of the stem preferably is rounded or cone-shaped and the closed end of the yoke 15 is cupped somewhat to engage the same. The bearing plate or disk 13 is formed with a central transverse raised boss 16 having diametrically opposed marginal slots 17. The arms of the spring yoke 15 are formed at their lower ends with inturned flanges 18 adapted to extend loosely within the slots 17 between the bearing disk 13 and the boss 16 thereof, whereby said disk is supported by said yoke which is in turn supported from the top of the stem 12, and said flanges are movable freely in said slots as the arms of the yoke move inwardly in response to pressure or outwardly when pressure is relaxed. Each arm of the spring yoke 15 is formed on its side margins with inturned flanges 19, extending from points near the upper ends of said arms to points near the inturned lower flanges 18, and said side flanges serve to strengthen, stiffen and reinforce the spring arms and prevent buckling or distortion under pressure. The arms of the yoke also are formed with central longitudinally extending bosses or ribs 20 preferably arcuate or concavo-convex in cross-section, which serve to further strengthen and reinforce them, and said ribs preferably merge at their upper ends into the cupped upper end of the yoke. A bridge or spreading plate 21 is formed separately from the yoke and has a central aperture 22 by which it is pivotally mounted on the upper portion of the stem 12 and said stem is received between the spaced arms of the yoke 15 and occupies a horizontal position just below the closed upper end of said yoke. The bridge or spreading plate rests on the upper ends of the side flanges 19 of the yoke arms and is supported thereby and confined between said flanges and the closed upper end of the yoke, and this is the sole means of mounting the plate relative to the other parts of the device, the end being accomplished without piercing or perforating the stem 12 of the yoke arms to provide supporting means therefor. The spreading or bridge plate 21 preferably is straight and plane on those margins within the arms of the yoke and curved on the margins between the said arms as indicated in Figure 3.

In use the device is assembled as shown and described and is mounted in a socket formed in or attached to an article of furniture or other load object by upward movement of the stem and spring yoke within said socket in a common manner until the lower end of the object rests on the bearing disk 13, the arms of the yoke being compressed or moved inwardly by contact with the walls of the socket, placing said yoke under tension and offering resistance to accidental withdrawal of the device. In the yielding movement of the spring arms a fulcrum is provided therefor by the rigid spreading and bridging plate 21 close to the juncture of said arms with the closed end of the yoke, and said plate further serves to prevent buckling or distortion of the spring yoke under excessive strains in use, and to limit inward movement of the upper ends of said yoke arms; and also serves to prevent tipping of the stem 12 relative to the load object, maintaining the caster in upright position.

I claim as my invention—

1. In a caster, a stem, a spring arch member rotatably mounted on the stem and having arms extended downwardly and outwardly from the top of the stem and designed to be inserted in a socket of a load object and to hold the caster in the socket by the resilience of the spring arms, a plate separately formed and arranged near the top of the stem, and extending entirely across and beyond the edges of said yoke arms, and reinforcing flanges formed on said arms and extended inwardly toward said stem and having their upper ends in supporting engagement with the lower surface of said plate.

2. In a swivel caster, a stem, a spring yoke member rotatably mounted on said stem and having its arms extended downwardly and outwardly from the top thereof, and a separate plate horizontally arranged within said spring yoke near the top of the stem, said arms being formed with marginal flanges extending nearly to the top thereof, said plate being confined between the upper ends of said flanges and the closed top of the yoke, and also engaging transversely of said yoke arms whereby a support is provided to prevent buckling of the yoke and also a fulcrum is provided for springing movement of the yoke arms.

Signed at Chicago, in the county of Cook and State of Illinois, this 12th day of March, 1924.

EDW. SCHULTZ.